(12) United States Patent
Zimmer et al.

(10) Patent No.: US 9,387,556 B2
(45) Date of Patent: Jul. 12, 2016

(54) METHOD AND SYSTEM FOR ASSEMBLING BLOW MOLDED PANELS TO CREATE CANTILEVERED STRUCTURES

(75) Inventors: Ronald A. Zimmer, Dewitt, IA (US); Alan W. Knapper, McCausland, IA (US)

(73) Assignee: Custom-Pak, Inc., Clinton, IA (US)

( * ) Notice: Subject to any disclaimer, the term of this patent is extended or adjusted under 35 U.S.C. 154(b) by 917 days.

(21) Appl. No.: 13/402,548

(22) Filed: Feb. 22, 2012

(65) Prior Publication Data
US 2013/0216741 A1    Aug. 22, 2013

(51) Int. Cl.
| | | |
|---|---|---|
| *B32B 1/02* | (2006.01) |
| *B23P 11/00* | (2006.01) |
| *B23P 19/00* | (2006.01) |
| *B32B 3/10* | (2006.01) |
| *B29C 65/56* | (2006.01) |
| *B29C 65/58* | (2006.01) |
| *B29C 65/00* | (2006.01) |
| *B29C 69/00* | (2006.01) |
| *A63H 3/52* | (2006.01) |
| *B29L 31/52* | (2006.01) |
| *B29C 49/00* | (2006.01) |
| *B29L 31/00* | (2006.01) |

(52) U.S. Cl.
CPC . *B23P 11/00* (2013.01); *A63H 3/52* (2013.01); *B23P 19/00* (2013.01); *B29C 65/56* (2013.01); *B29C 65/58* (2013.01); *B29C 66/126* (2013.01); *B29C 66/12449* (2013.01); *B29C 66/12469* (2013.01); *B29C 66/543* (2013.01); *B29C 69/00* (2013.01); *B32B 1/02* (2013.01); *B32B 3/10* (2013.01); *B29C 49/00* (2013.01); *B29L 2031/5209* (2013.01); *B29L 2031/729* (2013.01); *B29L 2031/7278* (2013.01); *Y10T 29/49826* (2015.01); *Y10T 29/53* (2015.01); *Y10T 428/13* (2015.01); *Y10T 428/24331* (2015.01)

(58) Field of Classification Search
USPC .......................................... 403/381
See application file for complete search history.

(56) References Cited

U.S. PATENT DOCUMENTS

| | | | | |
|---|---|---|---|---|
| 3,194,426 | A * | 7/1965 | Brown, Jr. ................... | 220/23.4 |
| 3,305,982 | A * | 2/1967 | Steele ........................... | 52/90.1 |
| 5,271,515 | A * | 12/1993 | Berkheimer et al. ......... | 220/4.27 |
| 5,316,159 | A * | 5/1994 | Douglas et al. ................ | 215/10 |
| 5,706,613 | A * | 1/1998 | Drake et al. .................. | 52/79.1 |
| 6,105,330 | A * | 8/2000 | Nanayakkara ................. | 52/606 |
| 6,557,191 | B2 * | 5/2003 | Bellows et al. ............... | 5/200.1 |
| 6,701,678 | B1 * | 3/2004 | Skov et al. .................... | 52/79.9 |
| 6,808,674 | B1 * | 10/2004 | Skov ............................. | 264/516 |
| 7,393,495 | B2 * | 7/2008 | Grinnall et al. .............. | 264/534 |
| D586,225 | S * | 2/2009 | Devereaux .................... | D9/541 |
| 7,806,038 | B2 * | 10/2010 | Duke ............................ | 89/36.04 |

(Continued)

*Primary Examiner* — Victor Macarthur
(74) *Attorney, Agent, or Firm* — St Onge Steward Johston and Reens LLC

(57) ABSTRACT

Assembling blow molded parts to form cantilevered structures incorporating a joint among three blow molded parts. A joint incorporates connector components from each part. One part comprises a cantilever, and has a tab with a through hole disposed substantially at the fixed end. The other two parts are assembled using a barbed post-and-hole joint, such that the post is inserted through the hole in the tab. The tab acts in tension at an angle to oppose the moment and shear generated by the weight of the cantilever. Other aspects of the invention include an additional dovetail joint connecting the cantilever part and the other part or parts, The dovetail joint may be blind, and may contribute to supporting the weight of, as well as opposing the moment and shear.

21 Claims, 12 Drawing Sheets

(56) References Cited

U.S. PATENT DOCUMENTS

| | | | |
|---|---|---|---|
| 7,845,266 B2* | 12/2010 | Duke et al. ................... 89/36.04 |
| 8,105,173 B2* | 1/2012 | Connors et al. ............... 472/116 |
| 2002/0070215 A1* | 6/2002 | Walsh et al. ....................... 220/6 |
| 2007/0006542 A1* | 1/2007 | Duke ............................... 52/561 |
| 2007/0102986 A1* | 5/2007 | Buhrman ................. 297/440.13 |
| 2009/0044827 A1* | 2/2009 | Zilber et al. ................... 132/297 |
| 2009/0165401 A1* | 7/2009 | Smalley, III .................... 52/91.3 |
| 2010/0044152 A1* | 2/2010 | Lipniarski ...................... 182/112 |
| 2010/0089336 A1* | 4/2010 | Flannery et al. ............... 119/498 |
| 2011/0086717 A1* | 4/2011 | Connors et al. ............... 472/116 |

\* cited by examiner

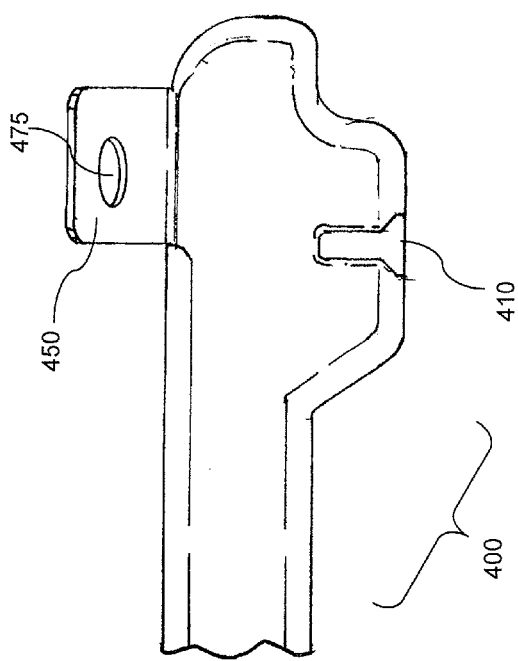
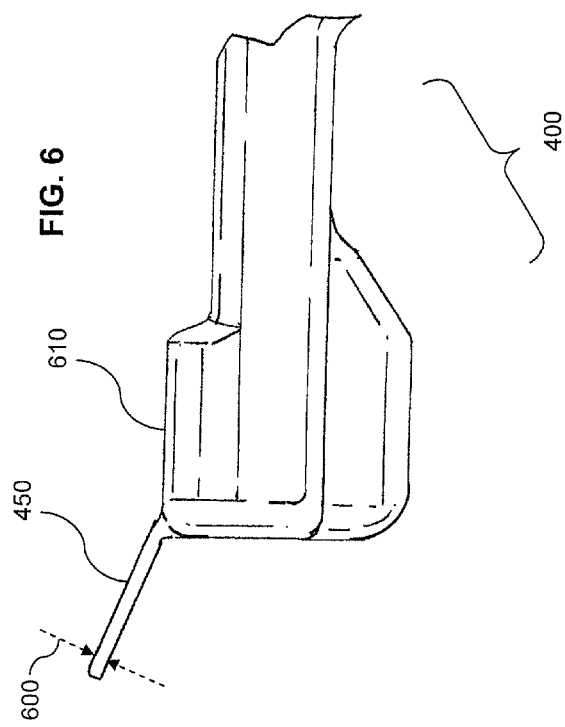
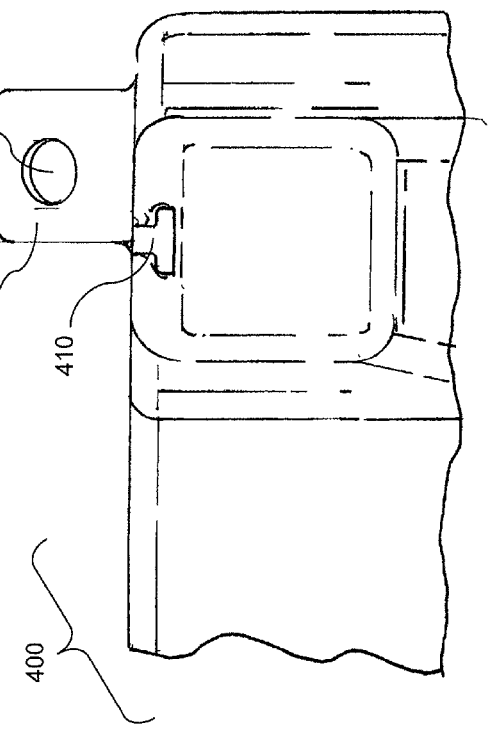
FIG. 5
FIG. 6
FIG. 7

METHOD AND SYSTEM FOR ASSEMBLING BLOW MOLDED PANELS TO CREATE CANTILEVERED STRUCTURES

FIELD OF THE INVENTION

The present invention relates to methods and systems for assembling blow molded parts. More specifically, the invention relates to a method and system of assembling blow molded parts to create cantilevered structures.

BACKGROUND OF THE INVENTION

The use of blow molded parts for assembling various sorts of articles is generally well known. However, creating cantilevered structures using blow-molded parts poses a challenge, particularly in that the moment and shear forces generated by the weight of the cantilever, or by other forces applied to the cantilever, can be difficult to manage using typical blow molded joints.

U.S. Pat. No. 6,557,191 Bellows et al. ("Bellows") discloses a blow molded bed frame having a male dove-tail receptacle and a male barb extending from the headboard. However, Bellows does not teach a female tab/strap or a three piece blow molded structure having a female tab/strap present between a male barb/female tab to hold a blow molded piece between two other blow molded pieces.

U.S. Pat. No. 5,706,613 to Drake, Jr. et al. ("Drake") discloses a playhouse with pivotally attached seats having a tongue and groove connection system. However, Drake does not teach a male/female dove-tail joint and male barb/female strap/female creating a cantilevered structure.

U.S. Patent Publication No. 2010/0044152 A1 to Lipniarski ("Lipniarski") discloses a blow molded plastic interconnection with a tongue and groove connection system. However, Lipniarski does not teach a male/female dove-tail joint and male barb/female strap/female creating a cantilevered structure.

The cited prior art references generally disclose blow-molded assemblies that are connected by various interfitting male-female connectors. However, these references do not disclose a system and method for assembling blow molded parts in a cantilevered arrangement. In particular, the references do not disclose a female strap or a three piece blow molded structure having a female strap present between a male barb/female tab to hold a blow molded piece between two other blow molded pieces to create a cantilever.

What is desired therefore is a system and method for connecting blow molded parts to form a cantilever that addresses these deficiencies.

SUMMARY OF THE INVENTION

Accordingly, it is an object of the present invention to provide a method and system for assembling blow molded parts to create cantilevered structures.

It is another object of the present invention to provide a system of blow molded parts comprising a joint to create a cantilevered structure.

It is a further object of the present invention to provide an assembly of blow molded parts having a cantilevered structure.

These and other objectives are achieved by providing a method for connecting blow molded parts, the method including the steps of providing a first blow molded part having a first connector component and a second connector component; providing a second blow molded part having a third connector component and a tab having a through hole; and connecting the first blow molded part to the second blow molded part by inserting the second connector component into the third connector component and inserting the first connector component through the through hole of the tab.

In some embodiments, the method includes the steps of providing a third blow molded part having a fourth connector component; connecting the first blow molded part to the third blow molded part by inserting the first connector component into the fourth connector component such that a portion of the tab is disposed between the first blow molded part and the third blow molded part.

In some embodiments, the first connector component is a barbed post, and the fourth connector component is a hole. Inserting the second connector component into the third connector component may form a dovetail joint. The dovetail joint may be a blind dovetail joint.

In some embodiments, tension created by inserting the first connector component through the through hole of the tab and by inserting the second connector component into the third connector component secures the first blow molded part to the second blow molded part.

In some embodiments, the first connector component and the fourth connector component are male and female counterparts. Optionally, the male counterpart comprises a barb, the female counterpart comprises accommodation for the barb, and inserting the male counterpart into the female counterpart results in a locking engagement between the male counterpart and the female counterpart. The barb may be disposed in a location on the male counterpart accommodating a thickness of the tab. The first connector component may be located on a first surface of the first blow molded part and the second connector component is located on a second surface of the first blow molded part.

In some embodiments the second blow molded part is a cantilever having a free end and a fixed end, wherein the tab is disposed at the fixed end to anchor the cantilever to the first blow molded part. Optionally, the tab is disposed to transmit forces in the cantilever to the first blow molded part. The second blow molded part may be blow molded as one piece.

In some embodiments, the fourth connector component is a punched hole in a surface of the third blow molded part, the surface of the third blow molded part having a controlled sidewall depth at the location of the punched hole. Inserting the first connector component through the through hole into the fourth connector component may secure the tab between the first blow molded part and the third blow molded part. Optionally, the tab may be replaced with a flexible strap.

Further objectives may be achieved by providing a system for assembling blow molded parts to form a cantilever structure including a first blow molded part having a first connector component and a second connector component; a second blow molded part having a third connector component and a tab having a through hole; and the first blow molded part connected to the second blow molded part by inserting the second connector component into the third connector component and inserting the first connector component through the through hole of the tab.

In some embodiments, the system further includes a third blow molded part having a fourth connector component; and the first blow molded part is connected to the third blow molded part by inserting the first connector component into the fourth connector component such that a portion of the tab is disposed between the first blow molded part and the third blow molded part. Optionally, the first connector and the second connector are male and female counterparts of a post-and-hole joint.

In some embodiments, the second blow molded part comprises a cantilever. Optionally, the tab is disposed to oppose moment forces or shear forces in the cantilever.

In some embodiments, the first blow molded part has an additional connector component and wherein the second blow molded part comprises a second tab disposed substantially at the fixed end, the second tab having a second hole, and wherein the first blow molded part is connected to the second blow molded part by inserting the additional connector component through the second hole.

In some embodiments, the first blow molded part is connectable to the third blow molded part by inserting the second connector into the third connector. Optionally, the second connector and the third connector are male and female counterparts of a dovetail joint.

Still further objectives are achieved by providing an assembly of blow-molded parts including a first blow molded part, a second blow molded part, and a third blow molded part, the third blow molded part including a tab having a hole; the first blow molded part connected to the third blow molded part using a first joint; the first blow molded part connected to the second blow molded part using a second joint; the tab incorporated into the second joint and is at least partially disposed between the first blow molded part and the second blow molded part; such that the third blow molded part comprises a cantilevered structure.

In some embodiments, the assembly is selected from a group consisting of a toy, house, shed, furniture extension, table, writing surface, bar, medical cart, visor, container, table, chair, package, carrying case, or enclosure.

In some embodiments, the third blow molded part comprises an awning of a toy house.

Yet further objectives are achieved by providing a method of creating a cantilevered structure including the steps of providing a first blow molded part, a second blow molded part, and a third blow molded part; providing a barbed post and a male dovetail element on the first blow molded part; providing a controlled-sidewall-depth hole on the third blow molded part; providing a female dovetail element on a first end of the second blow molded part; providing a tab having a through-hole on the first end of the second blow molded part; inserting the barbed post through the through-hole and inserting the male dovetail element into the female dovetail element; and, inserting the barbed post into the controlled-sidewall-depth hole.

Other objects of the invention and its particular features and advantages will become more apparent from consideration of the following drawings and accompanying detailed description.

BRIEF DESCRIPTION OF THE DRAWINGS

FIG. 5 is a side partial cutaway view of FIG. 4;

FIG. 6 is an alternate side partial cutaway view of FIG. 4;

FIG. 7 is a bottom partial cutaway view of FIG. 4;

DETAILED DESCRIPTION OF THE INVENTION

Figure 1:
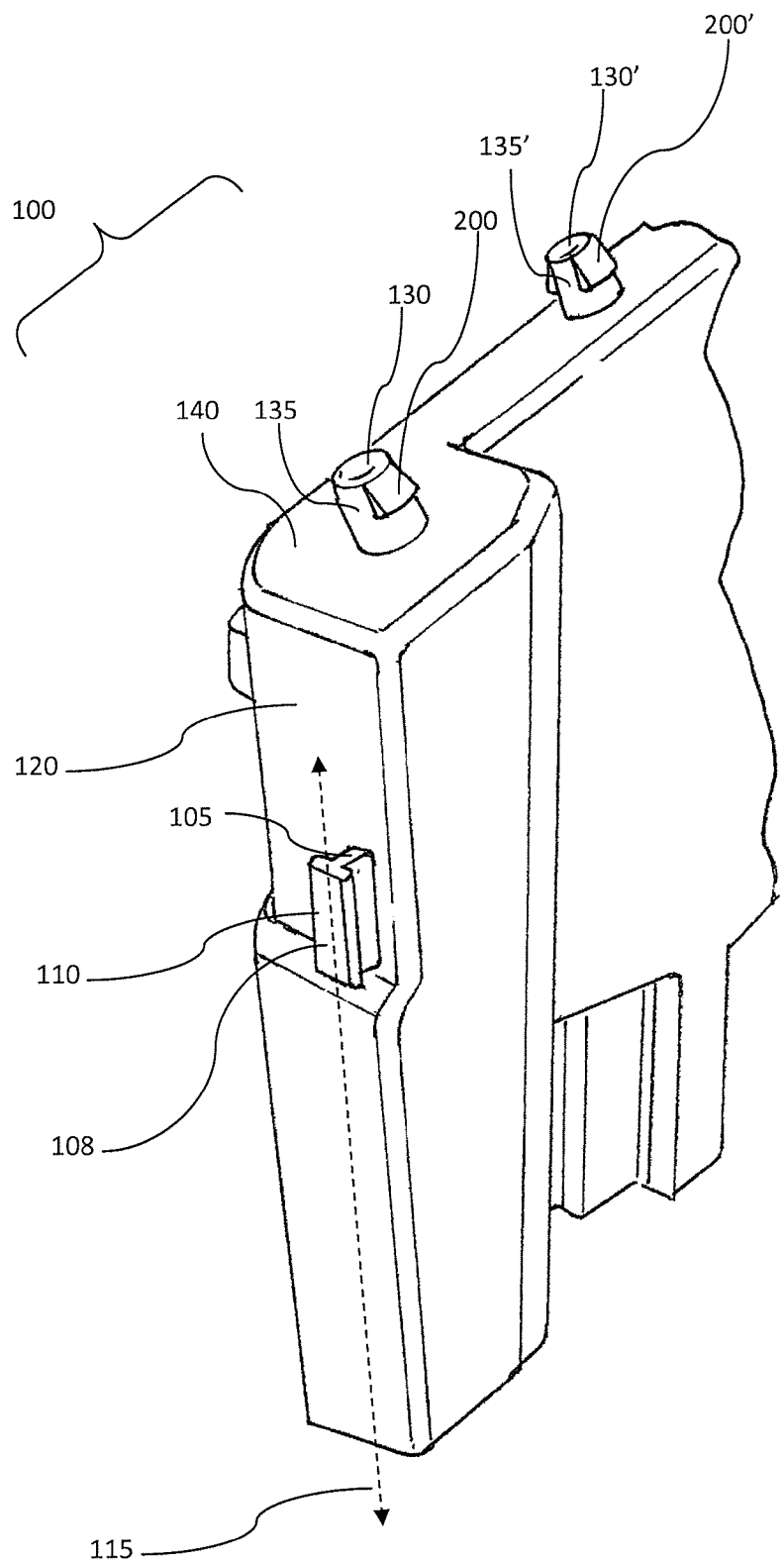
FIG. 1 is a perspective partial cutaway view of an example first blow molded part according to aspects of the invention.

FIG. 1 illustrates an example first blow molded part 100 according to aspects of the invention. Blow molded part 100 has a male dovetail joint element 110 disposed on surface 120, and a male barb joint element 130 disposed on surface 140.

Male dovetail joint element 110 is shown having a T-structure with a base portion 105 and extension portion 108. The extension portion 108 may protrude from the base portion 105 to form a T-shaped structure. Male barb joint element 130 is shown having base portion 135 and a barb 200.

First blow molded part 100 may be made from a plastic or other suitable blow-molding material. In some applications, first blow molded part 100 may be a weight bearing element of the cantilevered joint structure. For example, first blow molded part 100 may comprise a load-bearing wall of a toy house (see FIG. 10).

Male dovetail joint 110 may be disposed such that an insertion axis 115 is in a substantially vertical direction. Surface 120 may optionally be vertical, substantially vertical, within 45 degrees of vertical, or arbitrarily oriented, and in some variations may receive a component of the load of a cantilever when assembled according to aspects of the invention, as further described herein. Surface 120 may have one or more male dovetail joint elements.

Surface 140 may optionally be horizontal, substantially horizontal, within 45 degrees of horizontal, or arbitrarily oriented. Surface 140 is shown having male barb joint elements 130 and 130'. Surface 140 may have one or more male barb joint elements.

Figure 2:
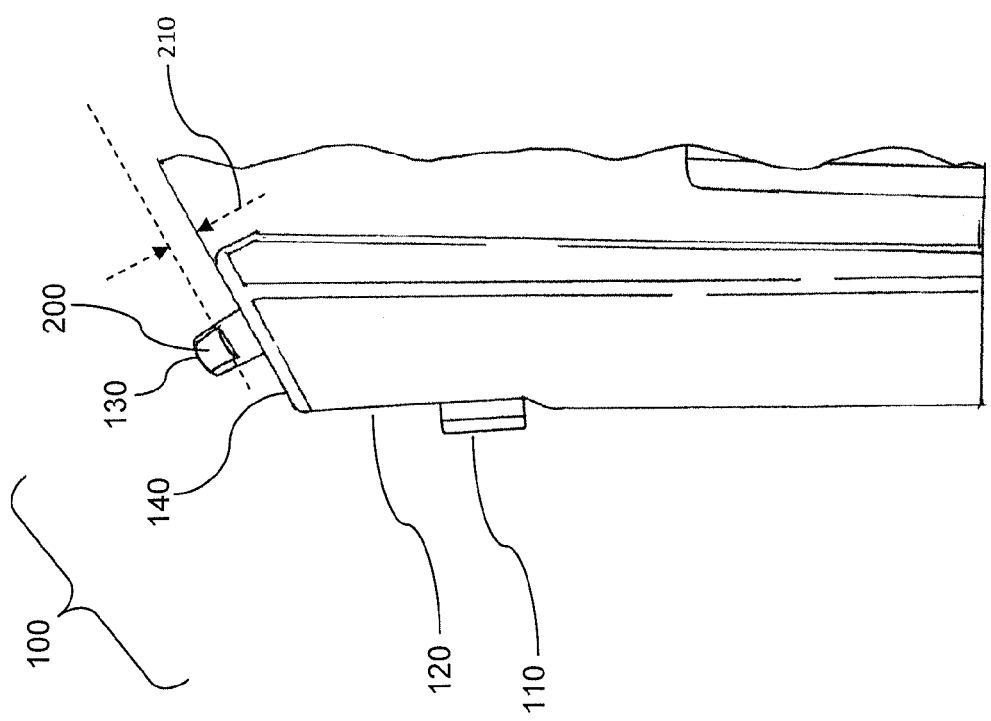
FIG. 2 is a side partial cutaway view of FIG. 1.

FIG. 2 is an side partial cutaway view of first blow molded part 100. FIG. 2 shows male barb joint element 130 having a barb 200. Barb 200 is disposed on male barb joint element 130 such that there is a barb clearance 210 measured between surface 140 and barb 200.

Figure 3:
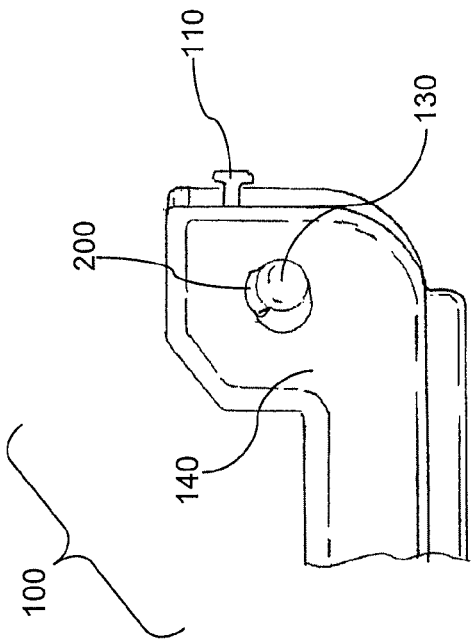
FIG. 3 is a top partial cutaway view of FIG. 1.

FIG. 3 is a top partial cutaway view of the example first blow molded part 100.

Figure 4:
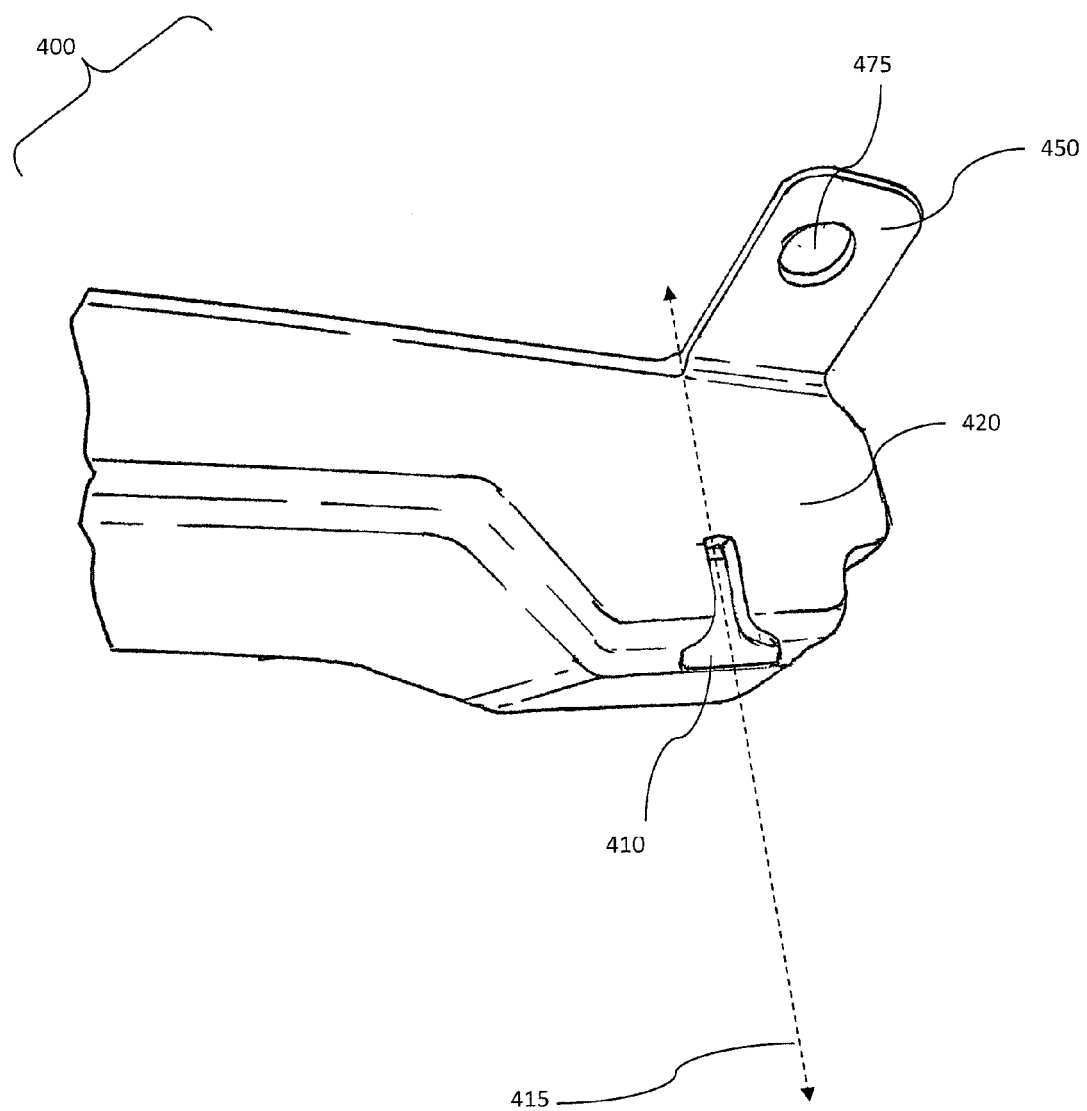
FIG. 4 is a perspective partial cutaway view of a second blow molded part.

FIG. 4 illustrates an example second blow molded part 400. Second blow molded part 400 may be made from a plastic or other suitable blow-molding material, and may be substantially similar in material composition to first blow molded part 100. In some applications, second blow molded part 400 has a cantilever element of a cantilevered joint structure. For example, second blow molded part 400 may comprise an awning structure of a toy house (see FIG. 10).

Second blow molded part 400 is shown having a female dovetail joint element 410 disposed in surface 420, and a tab 450 having through-hole 475 extending perpendicularly or approximaly perpendicularly to surface 420.

Female dovetail joint element 410 is a counterpart to male dovetail joint element 110 (FIGS. 1-3), and has an insertion axis 415. Female dovetail joint element 410 may optionally be a blind dovetail joint element, such that male dovetail joint element 110 can only be inserted to a certain depth. This may have the advantage of ensuring a particular arrangement of blow molded parts 100 and 400 with respect to one another.

Tab 450 extends from second blow molded part 400 and comprises a through-hole 475. Typically, tab 450 is made from plastic or another suitable material. Tab 450 may be formed as one piece with second blow molded part 400 and may have a controlled thickness.

FIGS. 5, 6, and 7 are alternate views of second blow molded part 400, including partial cutaway views. FIG. 6 illustrates tab thickness 600 of tab 450 as well as optional bearing surface 610.

Figure 8:
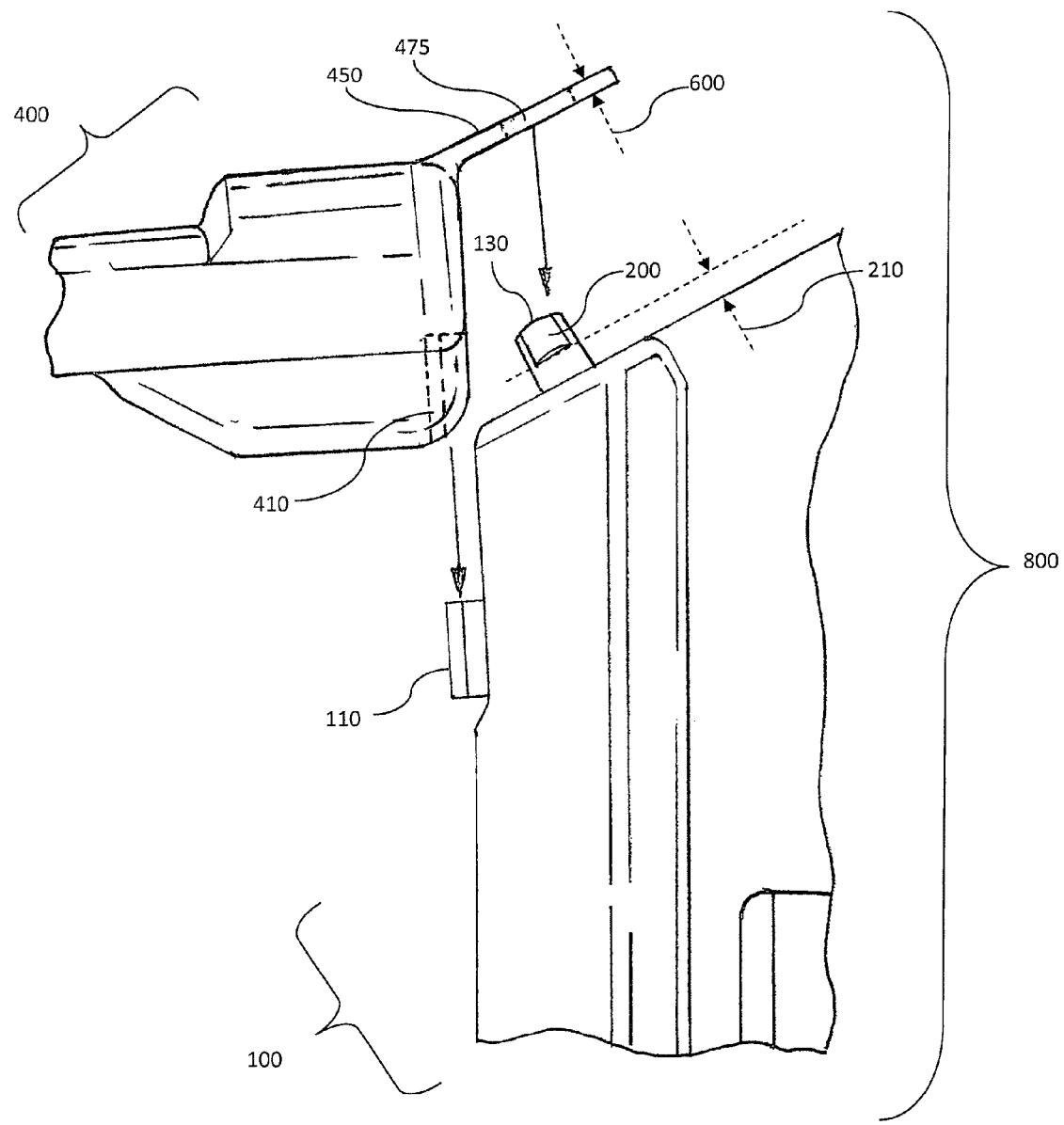
FIG. 8 is an exploded partial cutaway view of an example first assembly of a joint according to aspects of the invention.

FIG. 8 is an exploded view of first assembly 800. First assembly 800 is a first step in the construction of a full joint assembly according to the invention as further described herein. First assembly 800 comprises first blow molded part 100 assembled with second blow molded part 400. Second blow molded part 400 is assembled with first blow molded part 100 by engaging female dovetail joint element 410 with male dovetail joint element 110, and inserting male barb joint element 130 into through-hole 475. FIG. 8 illustrates tab thickness 600 compared to barb clearance 210.

The connection between female dovetail joint element 410 and male dovetail joint element 110 and male barb joint element 130 into through-hole 475 allows for the second blow molded part 400 to be secured to first blow molded part 100. The two connection points may prevent the second blow molded part 400 from pivoting relative to the first blow molded part 100 and allows for a tight and secure connection to be made between these parts resulting in a strong connection between blow molded parts that adds strength to the connection. The connection between second blow molded part 400 and first blow molded part 100 operate to resist moment and shear forces generated in the cantilever. In this arrangement, tab 450 can operate in tension to resist forces generated by the cantilever. In some embodiments, tab 450 can also act in compression to resist forces generated in the cantilever.

Figure 9:
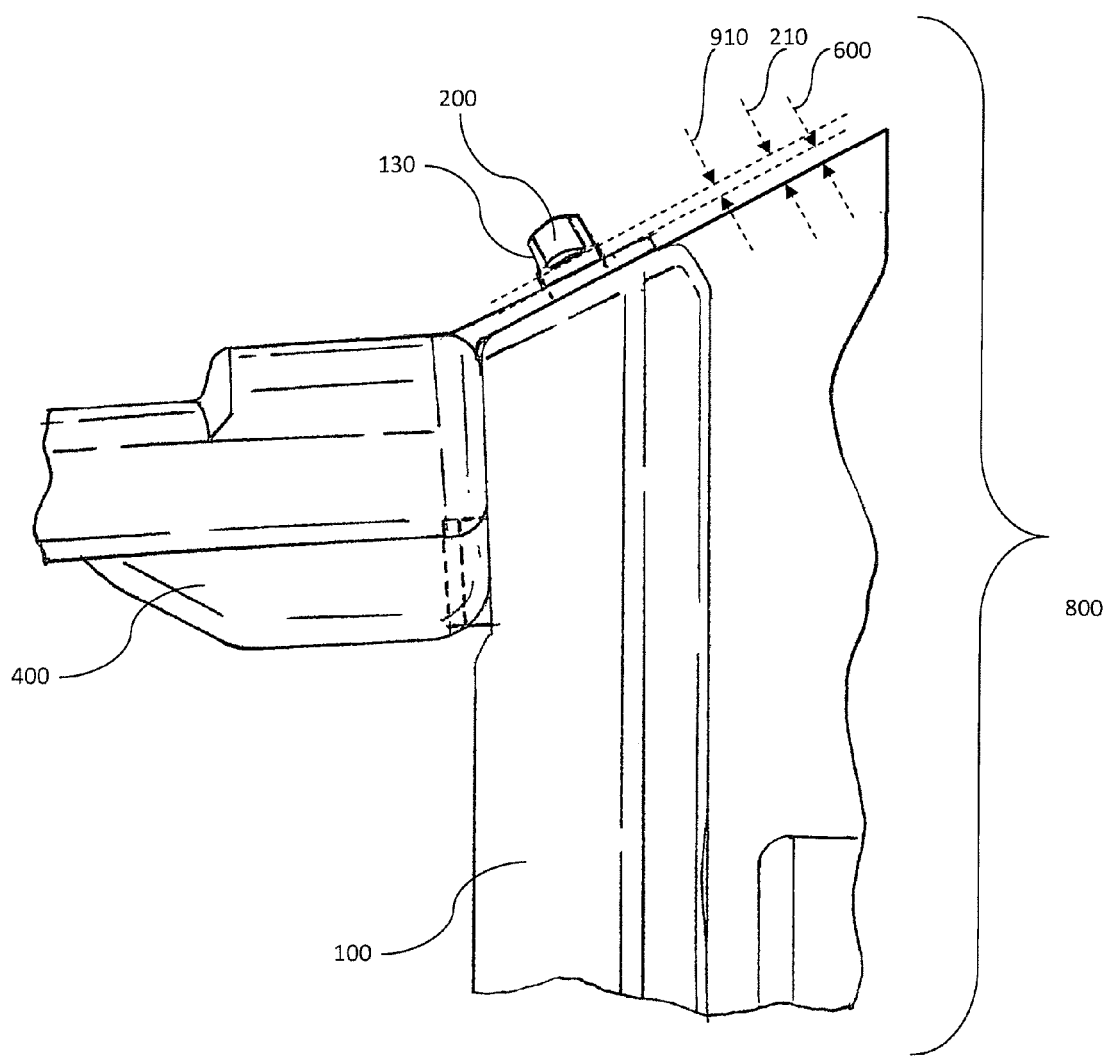
FIG. 9 is a side partial cutaway view of the example first assembly of a joint.

FIG. 9 is an assembled side view of first assembly 800. FIG. 9 illustrates tab thickness 600 being less than barb clearance 210. Wall thickness clearance 910 plus tab thickness 600 is approximately equal to barb clearance 210. FIG. 9 illustrates that surface 120 and surface 420 may optionally be constructed and disposed such that cantilever forces can be transmitted from second blow molded part 400 to first blow molded part 100.

Figure 10:
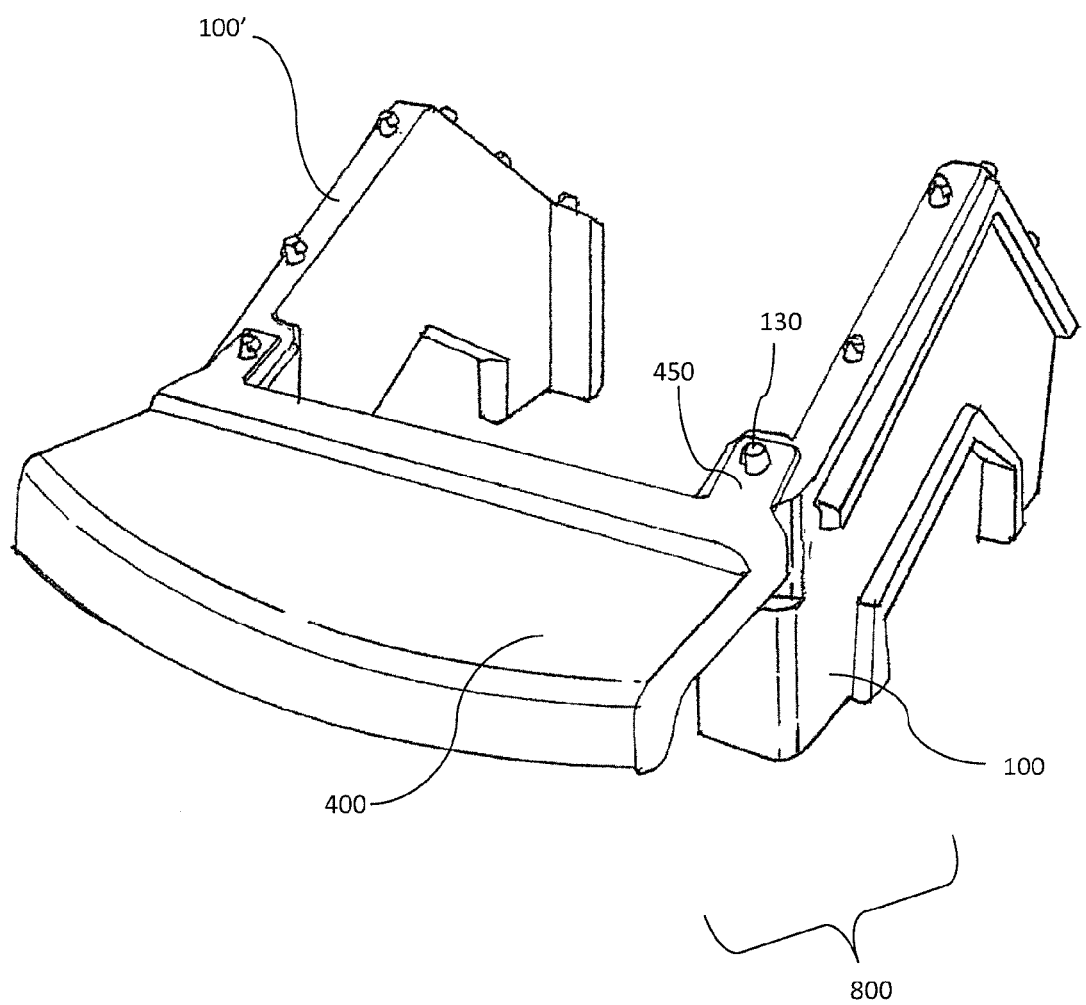
FIG. 10 is a perspective partial cutaway view of the example first assembly of a joint.

FIG. 10 is a perspective view of first assembly 800, where second blow molded part 400 is attached to first blow molded parts 100 and 100'. First blow molded part 100' is shown being a mirror image of first blow molded part 100. Second blow molded part 400 extends in a generally horizontal direction from first blow molded parts 100 and 100'. Having second blow molded part 400 connected to first blow molded parts 100 and 100' provides for the particular desired loading characteristics or other desired characteristics of the intended cantilevered structure.

Figure 11:
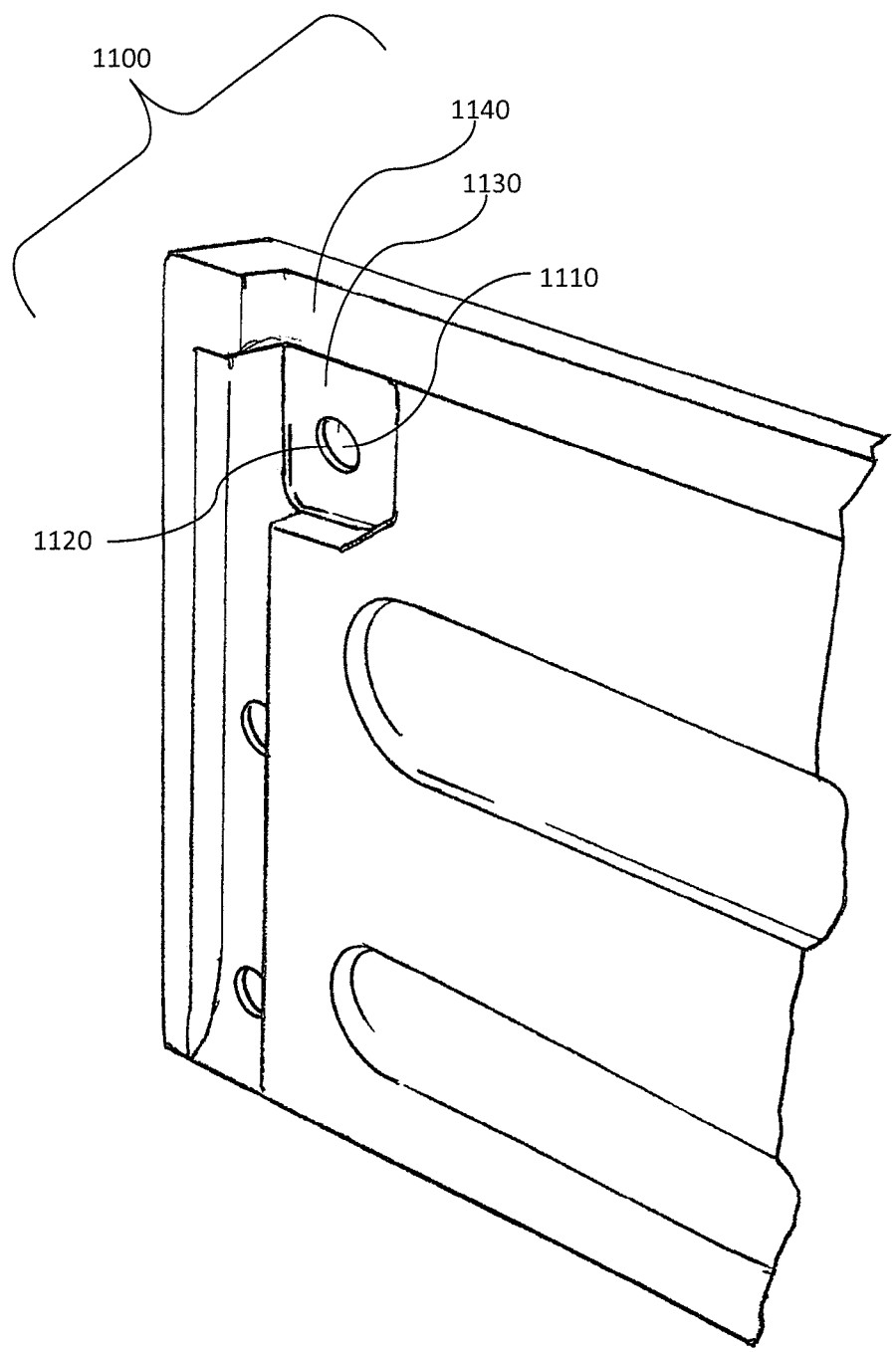
FIG. 11 is a perspective partial cutaway view of an example third blow molded part according to aspects of the invention.

FIG. 11 illustrates a third blow molded part 1100 according to aspects of the invention. Third blow molded part 1100 may be made from a plastic or other suitable blow-molding material, and may be substantially similar in composition to first blow molded part 100 and second blow molded part 400. In an example application, third blow molded part 1100 may comprise a roof structure of a toy house (see FIG. 14).

Third blow molded part 1100 is shown having female barb joint element 1110. Female barb joint element 1110 is a counterpart to male barb joint element 130, and may be a hole through a surface of third blow molded part 1100 having wall thickness 1120. Optionally, a relief area 1130 is provided which accommodates other elements of the overall joint assembly for example, portions of tab 450, part 400 and/or part 100. Optionally, third blow molded part 1100 comprises a bearing surface 1140.

Optionally, female barb joint element 1110 may be constructed by forming third blow molded part 1100 such that wall thickness 1120 is of a suitably uniform thickness, and subsequently cutting or boring a hole through the wall of third blow molded part 1100 in an appropriate location. Optionally, female barb joint element 1110 may be formed into third blow molded part 1100 during the blow molding process. Wall thickness 1120 may be controlled during the blow molding process to provide a structure having desired dimensions and mechanical properties.

Figure 12:
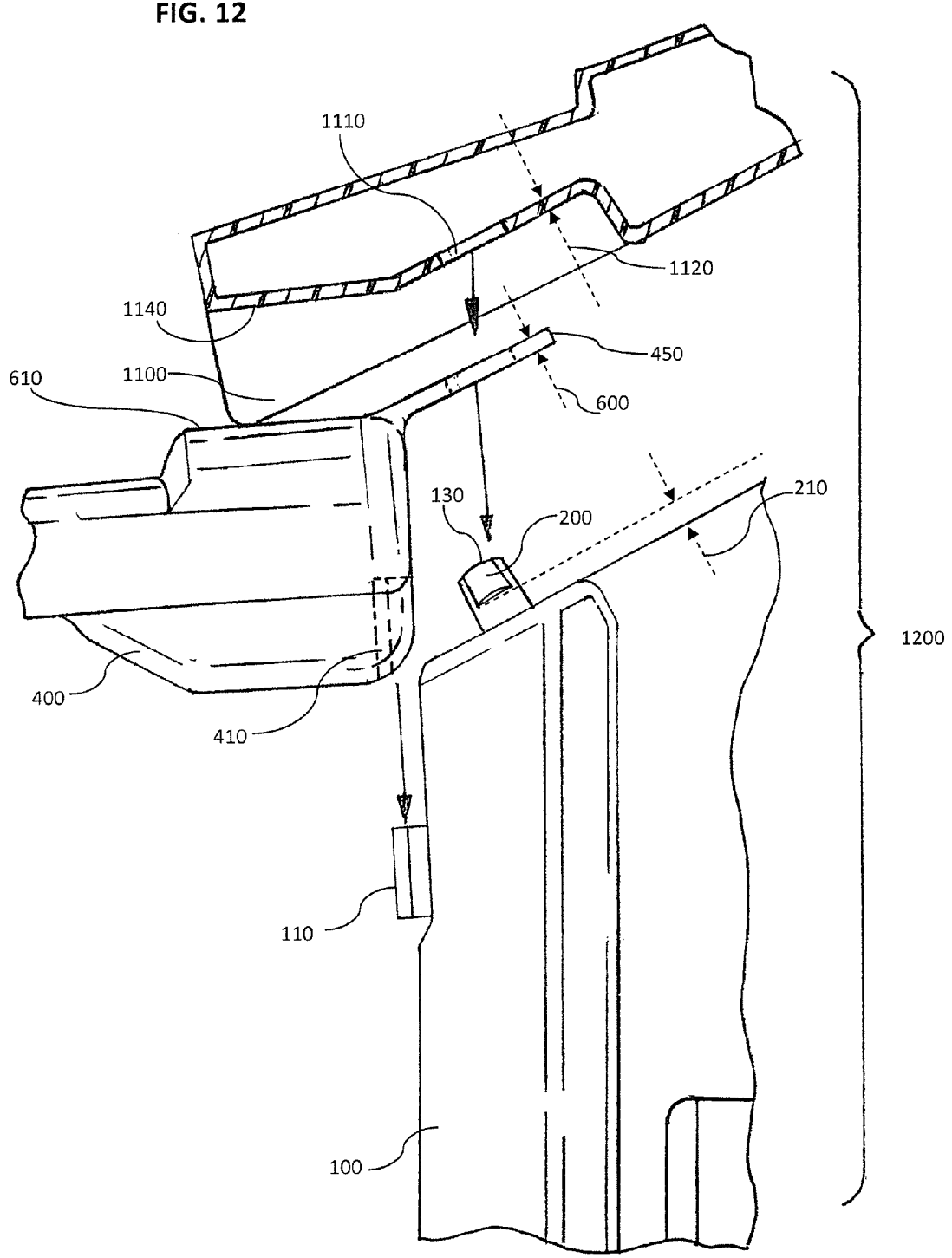
FIG. 12 is partially cross-sectional exploded view of an example full assembly of a joint according to aspects of the invention.

FIG. 12 is an exploded, partially sectioned side view of assembly 1200 of a joint according to aspects of the invention, showing a section of part 1100. Assembly 1200 includes first joint assembly 800 (FIGS. 8 and 9) with the addition of part 1100. Part 1100 is assembled with first joint assembly 800 by engaging female barb joint element 1110 with male barb joint element 130.

Parts 1100, 400, and 100 are held together by the engagement of female barb joint element 1110 with male barb joint element 130. Barb clearance 210 may be approximately equal to the sum of tab thickness 450 and wall thickness 1120. This can have the advantage of providing a suitably stable fit among the several engaging parts which form assembly 1200.

Figure 13:
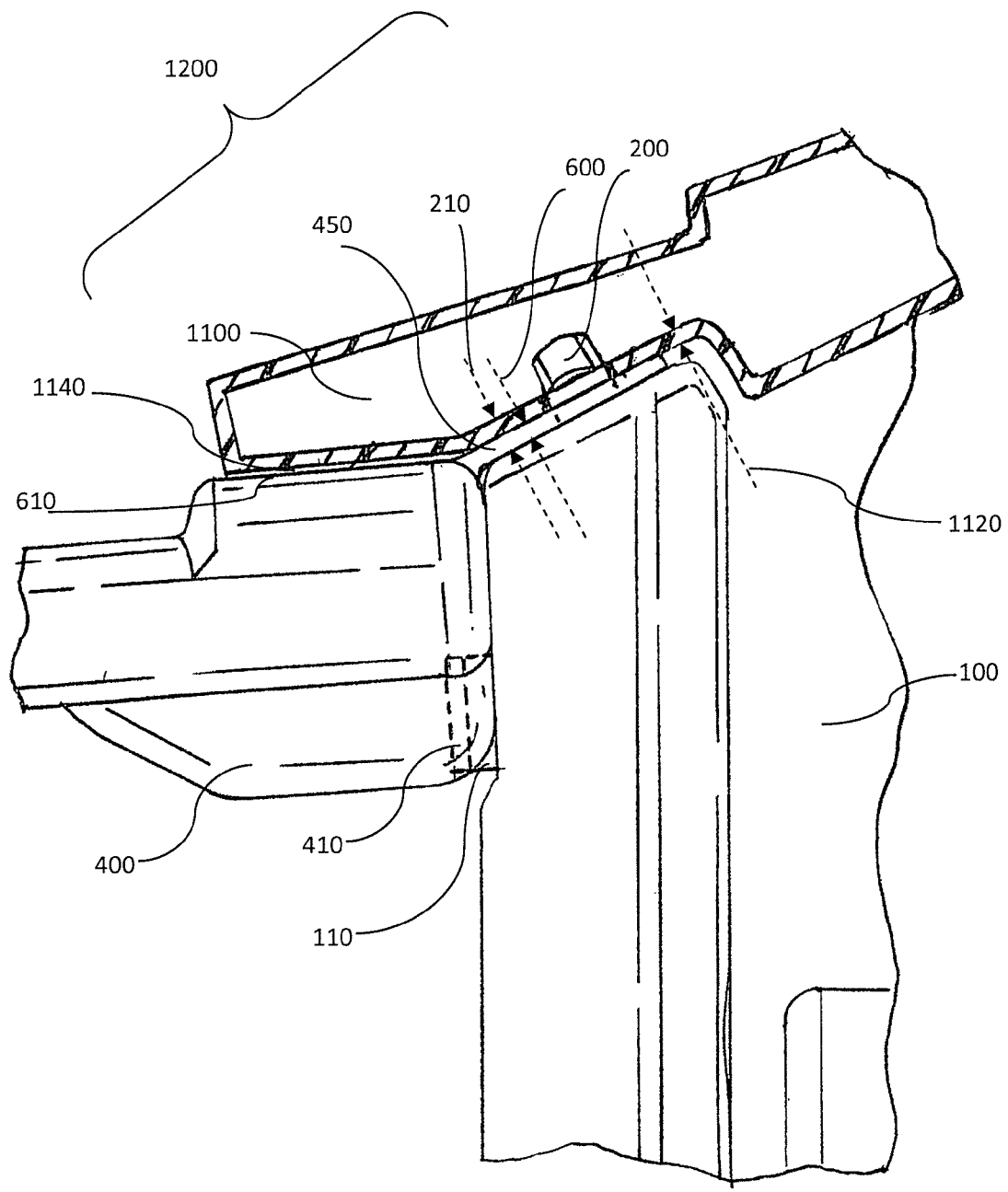
FIG. 13 is a partially cross-sectional side view of the example full assembly of a joint.

FIG. 13 is a side view of assembly 1200, showing a section of part 1100. Full assembly 1200 comprises the engagement of male barb joint element 130 with female barb joint element 1110, as well as the engagement of female dovetail joint element 410 with male dovetail joint element 110. Through hole 475 is engaged with male barb joint element 130 such that tab 450 is secured between part 100 and part 1100.

In full assembly 1200, part 100 functions as a weight bearing element and part 400 comprises a cantilever projecting from part 100. Tab 450 and female dovetail joint element 410 are disposed at the fixed end of the second blow molded part 400, which is also referred to as the cantilever part. Tab 450 is disposed above female dovetail joint element 410 in certain embodiments. This structural arrangement allows tab 450 to operate in tension to transmit a component of the forces produced by the weight of part 450, as well as other forces to first blow molded part 100, so that first blow molded part 100 supports the weight of second blow molded part 400 and third blow molded part 1100. Female dovetail joint element 410 also operates to transmit a component of the forces produced by the weight of part 450 to first blow molded part 100. Optionally, dovetail joint element 410 is a blind joint element, which may contribute additional support to the joint structure and further facilitate transmitting forces from part 450 to first blow molded part 100. Optionally, surface 420 may be shaped and disposed to correspond to surface 120 and may also transmit a component of forces from second blow molded part 400 to first blow molded part 100. Each of these elements also operates to transmit forces applied to the cantilever in upward, sideways, twisting, or other directions with respect to gravity. In some arrangements, tab 450 may also transmit forces in compression.

In some arrangements according to aspects of the invention, bearing surface 610 is disposed to transmit forces to bearing surface 1140. This structural arrangement, in combination with the other joint elements described herein, operates to resist upward or twisting forces applied to the cantilever.

Those having ordinary skill in the art will appreciate that assembling the elements as shown can have the advantage of providing a stable cantilever structure constructed using blow molded parts.

Figure 14:
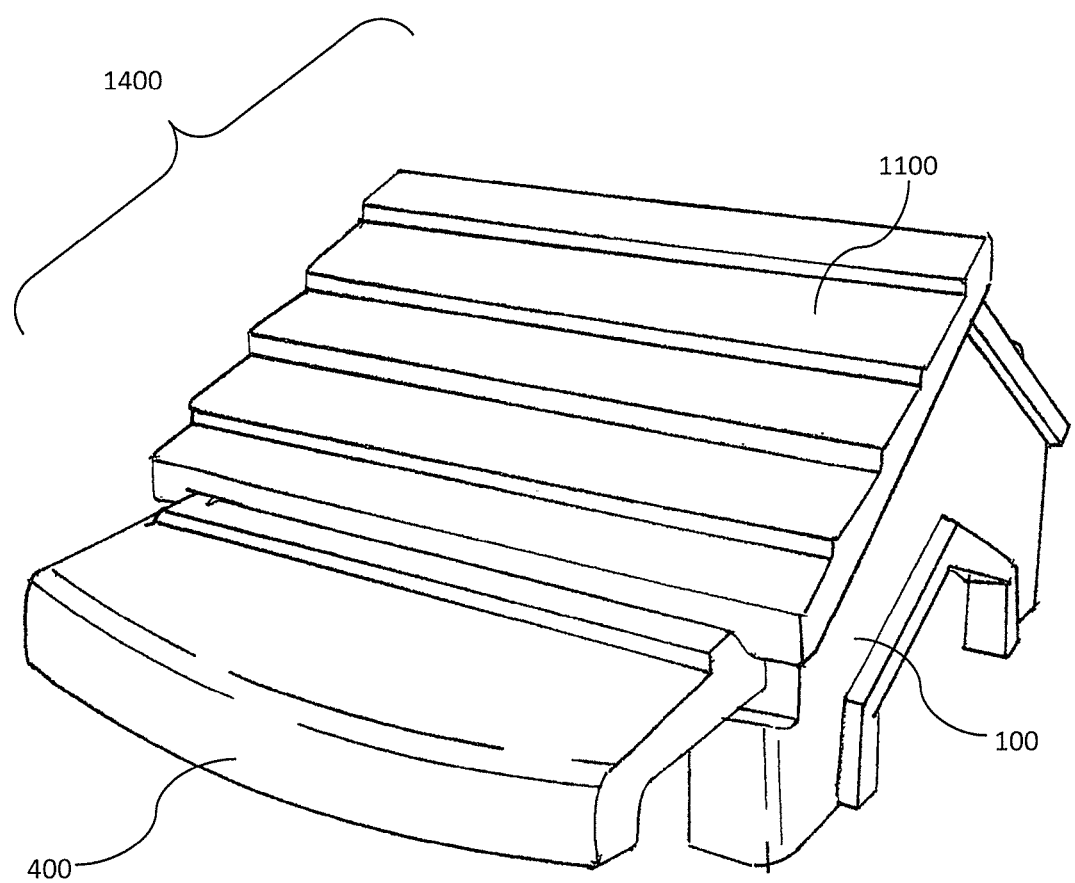
FIG. 14 is an illustration of a toy house according to aspects of the invention.

FIG. 14 is an illustration of a toy house 1400 according to aspects of the invention. Toy house 1400 is an example of an application of a cantilever structure according to aspects of the invention. In this application, first blow molded part 100 forms a side of toy house 1400; second blow molded part 400 forms an awning of toy house 1400; and third blow molded part 1100 forms a portion of a roof of toy house 1400. Assembly 1200 (FIG. 13) functions to hold the entire assembly together, as well as providing support for the cantilever structure formed by second blow molded part 400. In toy house 1400, a second instance of the full joint assembly is provided (not shown) to add stability to the cantilever structure, and additional instances may be added in order to impart desired structural characteristics without departing from the spirit of the invention.

Those having ordinary skill in the art will appreciate that many other applications of joint structure 1200 are possible. For example, a cantilevered structure assembled from blow molded parts according to aspects of the invention could be used in creating sheds, tables, chairs, carts, bars, or writing surfaces, and other structures.

Figure 15:
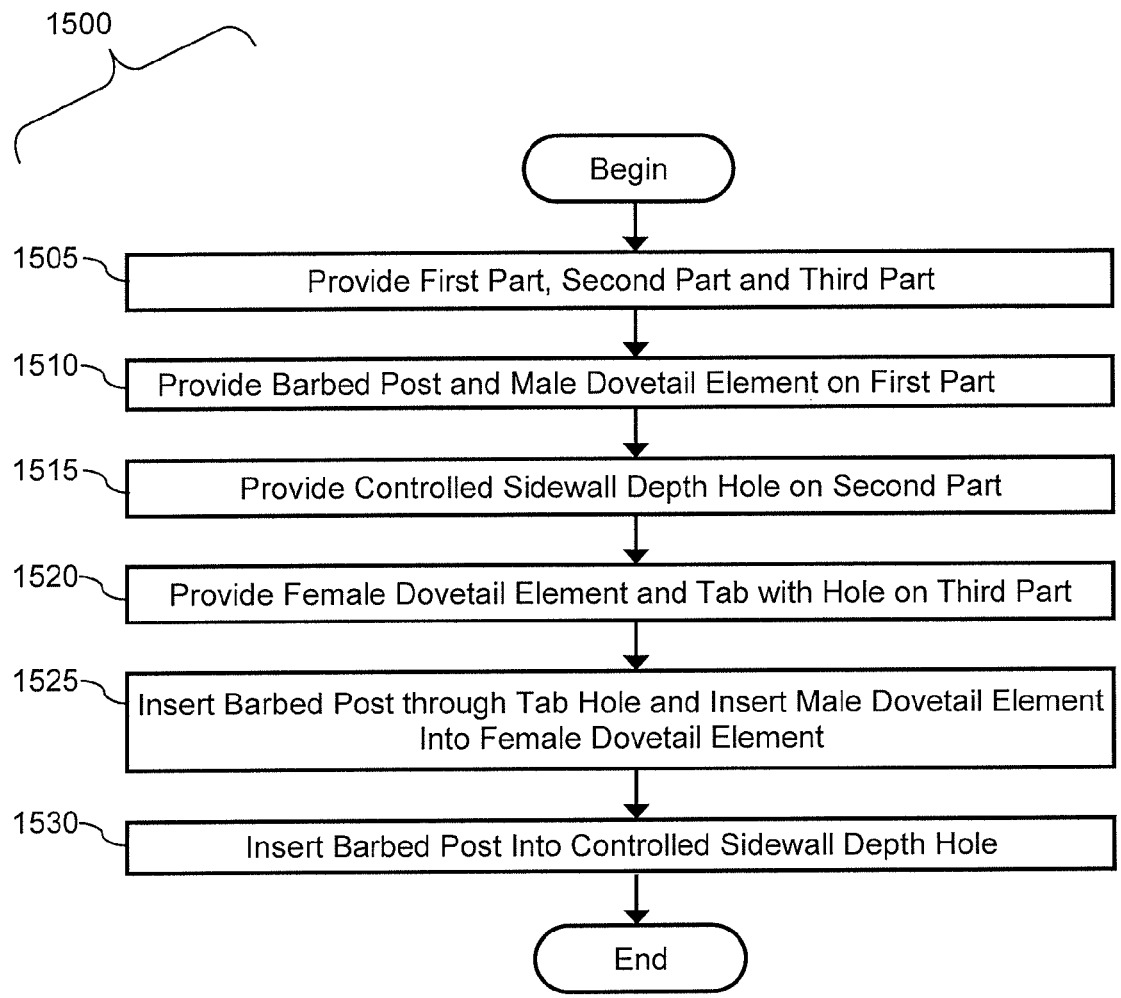
FIG. 15 is a flow diagram illustrating an example method according to aspects of the invention.

FIG. 15 is a flow diagram illustrating an example method according to aspects of the invention.

In step 1505 a first blow molded part, second blow molded part, and third blow molded part are provided. Each blow molded part may be made from a plastic or other suitable blow molding material. In an example application, the first blow molded part may be a load bearing wall of a toy house; the second blow molded part may be a roof element of the toy house, and the third element may be an awning of the toy house, where the awning comprises a cantilever structure projecting horizontally, or approximately horizontally from the toy house.

In step 1510 a first joint element and a second joint element are provided on the first blow molded part. In an example application, the first joint element is a male dovetail joint, and the second joint element is a male barbed-post joint element having a barb clearance between the body of the first blow molded part and a barb on the male barbed-post joint element. In the example application, the male dovetail joint may be disposed on a vertical, or substantially vertical surface of the first blow molded part, and may have an insertion axis in a substantially vertical direction.

In step 1515 a third joint element is provided on the second blow molded part. The third joint element is a counterpart to the first joint element. In an example application, the third joint element is a hole in the second blow molded part, and may be dimensioned and constructed to accommodate a barbed post joint. The hole may be formed by controlling the sidewall thickness of the second blow molded part in the location of the third joint element and subsequently boring a hole in that location. Optionally, the hole may be formed into the second blow molded part during the blow molding process.

In step 1520 a fourth joint element and a tab are provided on the third blow molded part. In an example application, the fourth joint element is a female dovetail joint element which is a counterpart to the second joint element. Optionally, the female dovetail joint element is a blind female dovetail joint element. The tab may comprise a plastic or other suitable material, and may be formed in one piece with the third blow molded part. In an example application, the tab may be disposed to substantially oppose the moment forces or shear forces in the third blow molded part in a cantilever structure of a final assembly.

In step 1525, the first blow molded part is connected to the third blow molded part by inserting the second joint element into the fourth joint element and inserting the first joint element through the hole such that the third blow molded part comprises a cantilever structure.

In step 1530 the first blow molded part is connected to the second blow molded part by inserting the first joint element into the third joint element such that part of the tab is disposed between the first blow molded part and the second blow molded part and such that the third blow molded part comprises a cantilevered structure. In an example application, the barb clearance is approximately equal to the sum of the thickness of the tab and the thickness of the sidewall of the second blow molded part at the location of the joint.

The present invention has been described above in terms of a presently preferred embodiment so that an understanding of the present invention can be conveyed. However, there are alternative arrangements for a method and system for assembling blow molded panels to create cantilevered structures. The scope of the present invention should therefore not be limited by the embodiments discussed, but rather it should be understood that the present invention is widely applicable to variable methods and systems in general. All modifications, variations, or equivalent elements and implementations that are within the scope of the claims should therefore be considered within the scope of this invention.

The present invention contemplates that where joints or connector elements are described as comprising male and female components, that such male and female components can be interchanged where appropriate without departing from the invention.

Although the invention has been described with reference to a particular arrangement of parts, features and the like, these are not intended to exhaust all possible arrangements or features, and indeed many modifications and variations will be ascertainable to those of skill in the art.

What is claimed is:

1. A system for assembling blow molded parts to form a cantilever structure comprising:
    a first blow molded part having a first connector component and a second connector component;
    a second blow molded part having a free end opposite a fixed end, the fixed end including a third connector component and a tab having a length and a through hole; and
    the first blow molded part connected to the second blow molded part such that the second connector component is connected to the third connector component to form a joint having an insertion axis and the first connector component is inserted through the through hole of the tab such that the tab provides either tensile or compressive resistance along the length of the tab to resist rotation of the second blow molded part relative to the first blow molded part about the joint;
    wherein the tab is spaced apart from the third connector component at a distance along the insertion axis;
    wherein the second blow molded part is configured as a cantilever.

2. The system of claim 1, wherein the system further comprises a third blow molded part having a fourth connector component; and wherein
    the first blow molded part is connected to the third blow molded part by inserting the first connector component into the fourth connector component such that a portion of the tab is disposed between the first blow molded part and the third blow molded part.

3. The system of claim 2, wherein the first connector and the second connector are male and female counterparts of a post-and-hole joint.

4. The system of claim 2 wherein the first connector component is a barbed post, and the fourth connector component is a hole.

5. The system of claim 1, wherein the tab provides tensile resistance against rotation of the cantilever with respect to the first blow molded part.

6. The system of claim 1, wherein the tab is disposed to oppose moment forces about the connection between the second and third connectors.

7. The system of claim 1, wherein the first blow molded part has an additional connector component and wherein the second blow molded part comprises a second tab disposed substantially at a fixed end of the second blow molded part, the second tab having a second hole, and wherein the first blow molded part is connected to the second blow molded part by inserting the additional connector component through the second hole.

8. The system of claim 1, wherein the first blow molded part is connectable to the third blow molded part by inserting the second connector into the third connector.

9. The system of claim 8, wherein the second connector and the third connector are male and female counterparts of a dovetail joint.

10. The system of claim 1, wherein the first joint is a dovetail joint including a male counterpart with a base portion and an extension portion, the extension portion protruding from the base portion to form a T-shaped structure.

11. The system of claim 1, wherein the first joint is a dovetail joint and a female counterpart of the dovetail joint corresponds to a male counterpart of the dovetail joint, so that the male counterpart of the dovetail joint is inserted into the female counterpart of the dovetail joint along the insertion axis.

12. The system of claim 1, wherein the first connector component is a barb having a base portion and a barb portion.

13. The system of claim 1, wherein the first connector component is located on a first surface of the first blow molded part and the second connector component is located on a second surface of the first blow molded part.

14. The system of claim 13, wherein the first blow molded part is secured to the second blow molded by the connection of the second component into the third connector component and the first connector component through the through hole of the tab.

15. The system of claim 1 wherein the second blow molded part is a cantilever having a free end and a fixed end and the tab is disposed at the fixed end to anchor the cantilever to the first blow molded part.

16. The system of claim 1 wherein the tab extends out a face of the second blow molded part in a direction along the length intersecting the insertion axis at an angle, the insertion axis defined by the third connector component.

17. An assembly of blow-molded parts comprising:
a first blow molded part, a second blow molded part, and a third blow molded part, the third blow molded part comprising a tab having a hole;
the first blow molded part connected to the third blow molded part using a first joint having an insertion axis;
the first blow molded part connected to the second blow molded part using a second joint;
wherein the tab is incorporated into the second joint and is at least partially disposed between the first blow molded part and the second blow molded part and the tab is spaced apart from the first joint at a distance measured along the insertion axis;
wherein the third blow molded part comprises a cantilevered structure having a free end opposite the first joint and the tab resists rotation of the third blow molded part about the first joint.

18. The assembly of claim 17, wherein the assembly is selected from a group consisting of a toy, house, shed, furniture extension, table, writing surface, bar, medical cart, visor, container, table, chair, package, carrying case, or enclosure.

19. The assembly of claim 18, wherein the third blow molded part comprises an awning of a toy house.

20. The assembly of claim 17 wherein the tab extends out a face of the third blow molded part in a direction intersecting the insertion axis at an angle, the insertion axis defined by the first joint.

21. The assembly of claim 20 wherein the cantilevered structure defines a fixed end the tab located at the fixed end.

* * * * *